Figure 1:
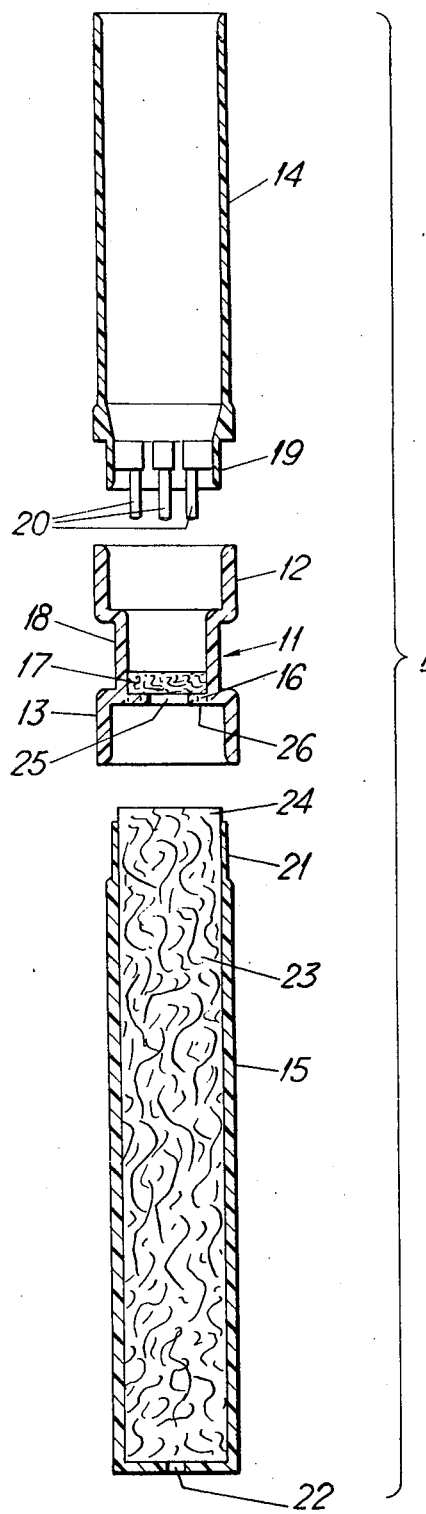

United States Patent [19]
Bagshawe

[11] 3,888,629
[45] June 10, 1975

[54] PERFORMANCE OF CHEMICAL OR BIOLOGICAL REACTIONS WITHIN AN ABSORBENT MATRIX PAD

[76] Inventor: Kenneth Dawson Bagshawe, 115 George St., Marble Arch, London, W.1, England

[22] Filed: Sept. 8, 1972

[21] Appl. No.: 287,344

[30] Foreign Application Priority Data
Sept. 8, 1971  United Kingdom............... 41972/71

[52] U.S. Cl............. 23/230 B; 23/230 R; 23/253 R
[51] Int. Cl....................... G01n 33/16; G01n 31/06
[58] Field of Search.................. 23/230 B, 253, 259

[56] References Cited
UNITED STATES PATENTS

| | | | |
|---|---|---|---|
| 3,206,602 | 9/1965 | Eberle | 23/230 B |
| 3,451,777 | 6/1969 | Di Giulio | 23/253 X |
| 3,615,222 | 10/1971 | Mead | 23/259 X |
| 3,640,687 | 2/1972 | Smernoff | 23/230 B |
| 3,743,482 | 7/1973 | Eisentraut | 23/230 B |

*Primary Examiner*—R. E. Serwin
*Attorney, Agent, or Firm*—Rose & Edell

[57] ABSTRACT

A reaction cell for the performance of radioimmunoassay determinations and like saturation analysis reactions has supported within it a matrix pad of absorbent material capable of retaining the necessary reagents for the reaction and serving as a site in which the reaction totally occurs. A separable lower chamber is fitted to the lower end of the cell and contains absorbent material to abut the matrix pad and promote filtration through the pad after the reaction has taken place. An upper reservoir chamber fits to the upper end of the cell to contain liquid for passing through the matrix pad. The matrix pad will commonly contain prior to the reaction a predetermined amount of an antigen or antibody in freeze-dried condition and possibly radioactivity labelled.

25 Claims, 2 Drawing Figures

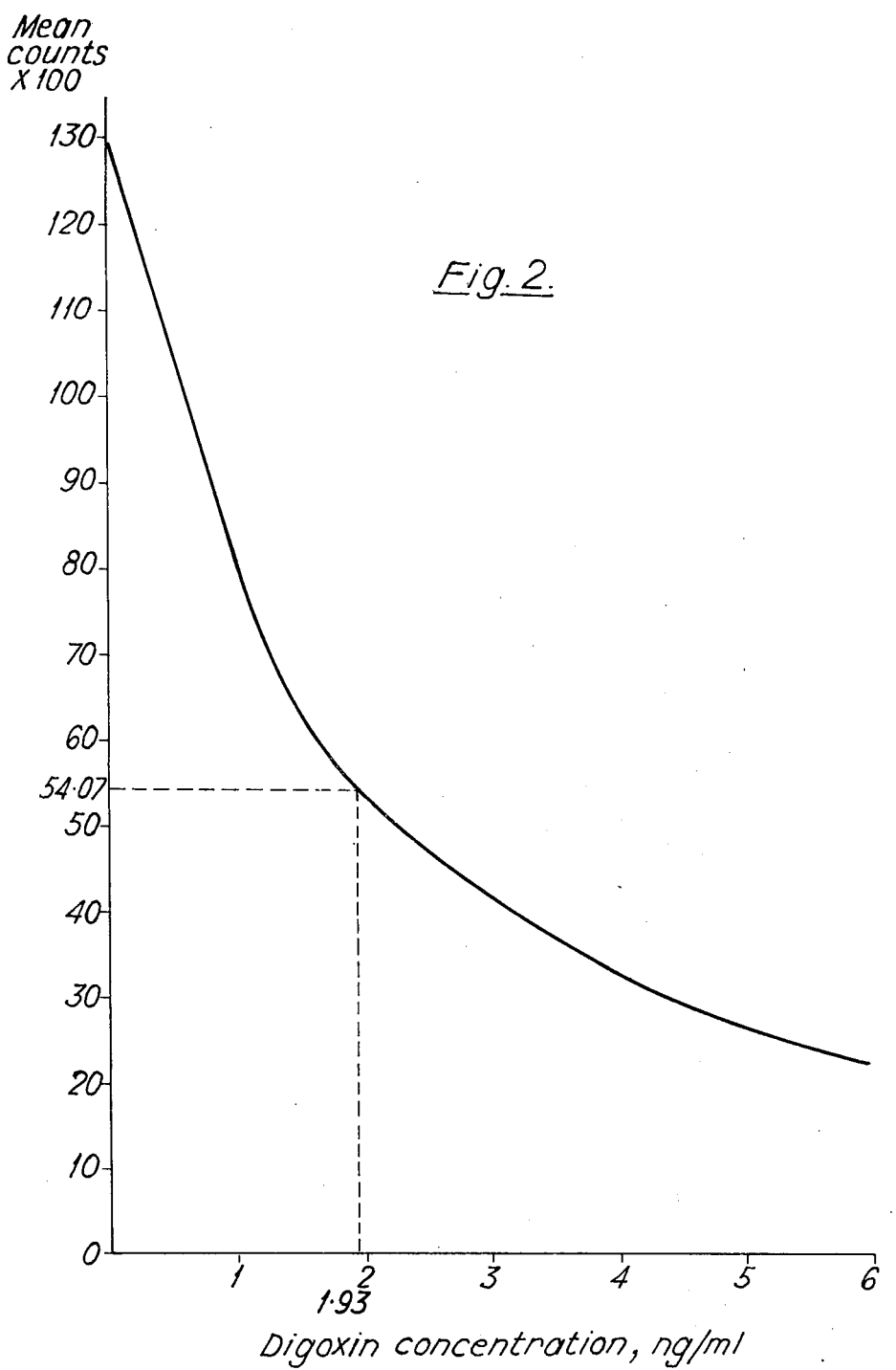

PERFORMANCE OF CHEMICAL OR BIOLOGICAL REACTIONS WITHIN AN ABSORBENT MATRIX PAD

This invention relates to the performance of chemical and/or biological reactions in laboratories, clinics and consulting rooms. It finds special use in the case of reactions performed for the detection and quantitative measurement of natural and synthetic proteins, polypetides, and a variety of other molecular complexes including steroids and drugs. The invention, which is an improvement in the invention disclosed in my patent application Ser. No. 143,134, filed May 13, 1971, is applicable particularly to the techniques of saturation analysis including radioimmunoassay but is not restricted to these.

In the performance of saturation analyses a defined amount of a specific reagent is progressively saturated by the test compound. The total volume of solution in which such analyses are carried out may be very small so that any loss of one or more of the reagents from the main reaction pool by splashing or wetting the reaction container above the fluid level introduces serious errors. It is an object of the present invention to eliminate, or at least substantially reduce, these errors.

According to the invention, there is provided a reaction cell, suitable for use in radioimmunassay, comprising a container having therein a matrix pad and a support for the matrix pad allowing the passage of liquid through the pad from one side to the other, the matrix comprising a porous absorptive material thereby to serve as a site of occurrence of a desired chemical and/or biological reaction in the liquid state and permitting the passage therethrough of a soluble or liquid reactant but capable of retaining within the matrix a particulate reaction product produced therein, the physical mass or volume of the matrix pad being so selected that it can hold all the liquid necessary for the desired reaction to take place entirely in the matrix.

The matrix may consist, for example, of glass, plastic, nylon, paper or metal in a porous form and providing an intercommunicating network of channels through the material. The material may thus be sintered, or fibrous, or sponge-like and it presents a large interface between itself and the air or liquid in the intercommunicating channels. Finely drawn glass fibre filter material has proved eminently suitable.

The invention further includes the method for the performance of a chemical and/or biological reaction, for example saturation analysis employing a radioactive marker, wherein the reaction takes place in the liquid state exclusively in an absorbent porous matrix to which the reactants are applied and a particulate reaction product is retained within the matrix upon removal of a soluble or liquid reactant from the matrix. Where the pore size of the matrix material is such that a solution, acting under the influence of natural gravity, passes through the material too slowly for practical use, then additional force may be applied. The methods used hitherto for inducing more rapid filtration have been (1) centrifugation; (2) positive pressure applied to the solution undergoing filtration; (3) negative pressure applied to the filtrate side of the filter membrane. Such negative pressure is normally provided by a vacuum source.

According to a preferred feature of the present invention, more rapid filtration is induced by means of a body of porous or cellular material substantially in contact with the filter medium or matrix.

Arrangements in accordance with the invention will now be described by way of example and with reference to the accompanying drawings, in which:

FIG. 1 is an exploded sectional view of a reaction cell together with upper and lower chambers used in conjunction therewith, and FIG. 2 is a graphical presentation useful in understanding the results of a specific digoxin assay to be described using such reaction cells.

Referring firstly to FIG. 1, the device shown comprises a reaction cell 11 which is open at both its upper and lower ends where it has enlargements or sockets 12, 13 to receive the lower and upper ends respectively of a separate upper tubular chamber 14 and a separate lower tubular chamber 15 that can be fitted to the reaction cell when desired. All three components can be made of a suitable inert plastics material. Within the reaction cell 11, at the level where the lower socket 13 joins the central body 18 of the cell, there is an internal shelf or ledge 16 providing support for a matrix pad 17, which is preferably a circular disc punched out of a sheet of glass fibre filter material, having a diameter such as to fit snugly into the bore of the central body of the cell and occlude it. The depth of the central body 18 of the cell, in relation to the thickness of the matrix pad 17, is such that one or several more such pads could be accommodated in the central body, in contiguity with the pad 17 and with one another, before reaching the upper socket enlargement 12.

The upper chamber 14 is basically a simple open-ended reservoir tube, except that its lower end is reduced at 19, to fit into the upper socket 12 of the reaction cell 11, and this lower end is also provided internally with three depending prongs 20, attached to its walls, which descend into the reaction cell when the two parts are fitted together and trap the matrix pad or pads in the central body of the cell.

The lower chamber 15 is again basically a simple tube, with a reduced upper end 21 to fit into the lower socket 13 of the reaction cell, this tube having its lower end closed except for a central drain hole 22. The tube 15 is entirely filled with a body of absorbent material 23 which protrudes a short distance from the open upper end of the tube, as seen at 24. This body of absorbent material may, for example, be a loose roll of absorbent tissue or cellulose wadding. When the reaction cell 11 and the lower chamber 15 are fitted together, the upper end of the absorbent material 23 becomes pressed into intimate contact with the matrix pad 17, through the aperture 25 within the internal support ledge 16 of the cell, by reason of the protrusion of the absorbent material. The pressure of the comparatively large body of absorbent material 23 in contact with its underside therefore induces considerably more rapid filtration of liquid through the matrix pad than would otherwise occur purely under gravity, the surface tension or capillary effect within the absorbent material drawing liquid away from the interface between the absorbent material and the matrix pad. This may be assisted by the provision of grooves in the underside of the ledge 16, as at 26.

In use of the device, a chemical and/or biological reaction is performed entirely within the matrix pad 17 which affords an intercommunicating network of chanls. The matrix pad may be initially free of a ligand or pretreated with one or more ligands.

In performing the reaction the volume of the matrix selected to suit the volume of the reactant mixture and whilst the reaction is taking place the matrix is just saturated so that its exposed surfaces appear moist. The matrix can be selected so that it performs an additional function of physically separating one component, or product of the reaction, from another, by adsorption or absorption to its surface, or by entrapment in the mesh of the matrix, which thus acts also as a filter. With the matrix enclosed within the cell 11 and the upper channel 14 fitted, it is possible for wash solution to be applied at the end of the reaction so as to remove those soluble or liquid reactants not adsorbed, absorbed or entrapped within the matrix.

The advantages are that splashing and uncontrolled wetting are reduced, that the large interface afforded by the matrix facilitates a complete interaction of the reactants in a short time and that final quantitative separation of the reactants is facilitated by washing in situ. If one or more of the reagents is retained within or absorbed upon the matrix prior to starting the reaction, such reagent or reagents predispensed into the matrix may be freeze-dried and thus held in a stable form for prolonged periods before use. Where more than one reagent is to be so dispensed, it may be convenient to lay a matrix layer containing one freeze-dried reagent upon another matrix layer containing another freeze-dried reagent and in this way prevent their interaction until the reaction is started by the addition of liquid.

A preferred use of such a reaction cell is to estimate the amount of an antibody or antigen in a sample of liquid, and the following description is mainly directed to this preferred use of the cell.

The matrix pad is preferably pretreated with an inert (non-reactant) macromolecular substance, for example a protein, thus preventing nonspecific binding of the liquid (e.g. an antigen or antibody) to the matrix fibres. Albumin is such a coating substance. Alternatively, a predetermined amount of the liquid may be adsorbed on to the fibres, and then the remainder of the fibres coated with the inert coating substance. In this technique the ligand is then bound in the matrix and cannot be washed through in a filtration process.

The total volume of liquid containing the ligands added must not exceed the absorptive capacity of the matrix. When the ligand has been added, the pad may be used as it is, or the ligand freeze-dried in the pad. The coating and the addition of one or more of the ligands may be carried out before or after the matrix is introduced into the reaction cell. Preferably, the matrix is punched out of a sheet of the matrix material and incorporated in the cell already coated, and optionally with a ligand already incorporated therein.

Except where the ligand is freeze-dried or adsorbed on the fibres, it is retained in the matrix by the surface tension of the liquid in and on the matrix.

Several ligands may be incorporated in the matrix and in like fashion. For example, in liquid or freeze-dried form, there may be included a defined amount of antigen or antibody and a defined labelled amount of the corresponding antibody or antigen respectively. Where the reaction cell is to be a reference or standard, a defined amount of the standard antigen or antibody, as appropriate, may also be present in the matrix in freeze-dried form. Where a corresponding (reacting) antibody and antigen are present in such a matrix, they must be incorporated under conditions such that they will not react until required, for example at low temperatures.

An alternative arrangement, as already mentioned, is to include each of the ligands in a separate matrix pad, one then placed upon the other in the reaction cell, optionally separated by similar pads free of ligands. Again, in such an arrangement, the ligands are advantageously freeze-dried.

In one example of a specific type of determination, a matrix pad, say free of ligand, is included in the reaction cell in order to determine the amount of antigen in a sample of liquid. A predetermined amount of the corresponding antibody is added to the pad in a volume of liquid which can be entirely absorbed by the pad. The same procedure is carried out with another reaction cell. To one pad is then added the sample of antigen to be determined, incorporated in a volume of liquid which can be entirely absorbed by the pad. To the other pad is added a known amount of the antigen in the form of a reference standard solution. To both cells are then added a solution of radioactive labelled antigen, for example radioactive iodine, $I^{125}$ or $I^{131}$, in such a volume that all the liquid is again absorbed in the matrix pads. The upper and lower chambers are then added to each cell, and an inert liquid, for example a buffer, is poured into both upper chambers and will filter through to the lower chambers, filtration being aided by the optional porous absorbent material in the lower chamber. The filtrate will include labelled antigen which has not bound with the antibody, the antigen/antibody complex being retained within the interstices of the matrix. The matrix pads or the lower chambers are then dried, and the radioactivity in one or the other, or both measured to give a measure of the amount of antigen.

The same technique may be applied to measure the amount of an antibody. In this case, a predetermined amount of antigen is incorporated in the matrix, and radioactivity labelled antibody is used.

In the case where (for example, in measurement of antigen) both the predetermined amount of the corresponding antibody and labelled antigen are present freeze-dried in the matrix, then only the sample antigen and then washing fluid need be added. As indicated above, a standard reference cell may also incorporate the known amount of antigen as well as the antibody and labelled antigen, and in this case only the washing liquid need be added.

Where a matrix pad contains a ligand in solution, then the absorbent material in the lower chamber should not contact the matrix pad, otherwise some of the ligand will pass into the lower chamber before the reaction is carried out.

The expression 'corresponding' when applied to an antigen or antibody means that one such substance forms with its 'corresponding' substance, an immunoprecipitate. Thus, for example, an antibody which has been raised against an antigen is the corresponding antibody to that antigen in so far as it is capable of forming with it an immunoprecipitate.

The material and formation of the matrix pad is so chosen that the product of the reaction therein is retained within the interstices. Thus the particles of an immunoprecipitate are trapped within the interstices of the matrix pad.

Desirable properties of a matrix pad are:

a. Instantaneous soaking up of a liquid applied to it.

b. Allowance of rapid and even flow through the pad of a reagent added in excess of the pad's absorptive capacity. It would be thought that rapid flow would be likely to displace some of a precipitate from the pad: in practice this is not so.

c. Low blank adsorption of a reactant, for example the labelled ligand. Non-specific adsorption can be catered for by the use of standards, but if the degree of adsorption differs substantially between the standard cell or cells and the reaction cell or cells, then there will be a discrepancy in the results.

Reaction cells according to the invention can advantageously be supplied as a kit, comprising the following components:

a. At least two reaction cells, each cell having a matrix pad incorporating a known amount of antibody, preferably freeze-dried.

b. For each reaction cell, an upper and lower chamber, the latter incorporating an absorbent material.

c. A separate tube of radioactively labelled corresponding antigen, preferably freeze-dried.

d. A separate tube of a liquid buffer.

e. At least one tube of a known amount of the unlabelled corresponding antigen, preferably freeze-dried.

Optionally, the reaction cell containing a freeze-dried antigen (or antibody) may be sealed in a plastic envelope, which may contain a desiccant, to prevent absorption of moisture, though in practice this is not found to be a problem.

Specific antigens which are of especial interest for measurement are:

a. Digoxin Human chorionic somatommammotrophin.

b. Insulin.

c. Growth hormone.

In a matrix pad supplied for estimating any of these antigens, there will therefore be antibody to one such antigen.

By way of further illustration of the use of the invention, the performance of any specific example of a digoxin assay will now be given.

1. Preparation of antibody-impregnated filter material

Diluent: 40 mM phosphate buffer, pH 7.4, containing 4% bovine albumin was used throughout.

To 30 ml of a 1 in 20,000 dilution of a rabbit antidigoxin serum in a conical flask was added an equal volume of a 1 in 400 dilution of donkey anti-rabbit globulin; these dilutions were determined by previous experiment to give optimum results in the assay. The reagents were immediately mixed by swirling the flask and were then decanted into a perfectly flat-bottomed tray measure (internally) 10½ × 8½ × ½ inches containing a sheet of Whatman type B glass fibre filter material measuring 10 × 8 inches. The tray was tipped from side to side to distribute the liquid evenly throughout the filter sheet and was then set aside on a horizontal surface in a humid chamber at 4°C for 18 hours to allow formation of the immune precipitate. After incubation in this fashion the tray with its contents was removed to a freeze-drying chamber for desiccation.

2. Preparation of the reaction cells

Three thicknesses of the impregnated filter material prepared as described above were punched into discs and inserted into the reaction cells using a tool designed for this purpose. Thus each reaction cell contained three thicknesses of material, determined by previous experiment to be just sufficient to absorb 0.1 ml of liquid. Twenty-four such cells were prepared.

3. Assay of digoxin in a plasma sample of unknown content

Reagents:

a. A radio-iodinated ($^{125}I$) derivative of digoxin diluted to a concentration of 2 ng/ml in the phosphate-albumin solution described above.

b. A series of digoxin-in-serum standards prepared in bovine serum. The digoxin concentrations used were:
 Zero, 0.5 ng/ml, 1 ng/ml, 2 ng/ml, 3 ng/ml, 4 ng/ml and 6 ng/ml.

Eight small plastic tubes were set out and labelled appropriately, one for each standard and one for the sample to be assayed. 0.2 ml of the radio-iodinated digoxin derivative ("tracer") was added to each tube, followed by a similar volume of the appropriate standard or plasma sample. The contents of each tube were mixed by touching to a vortex mixer.

Three reaction cells were set out for each standard and plasma sample. The cells were mounted on a series of pegs projecting from a board, effectively blocking their lower ends and preventing evaporation from the bottom of the filter discs in the centre of the cells.

0.1 ml aliquots of the contents of each tube were pipetted on to the centre of the filter discs of each of the triplicate reaction cells for each standard or plasma sample. This volume of liquid was completely absorbed by the filter discs within seconds of application. The upper (reservoir) section of the reaction cell system was then inserted into the upper ends of the cells themselves with the purpose of diminishing evaporation from the filter discs during the remainder of the experiment.

The reaction cells were then set aside for 1 hour at room temperature (approximately 22°C) for the reaction of digoxin with antibody to take place. After this incubation period the cells were taken off the pegs on which they had stood and were plugged onto the top of the lower section of the reaction cell system. The lower units contained absorbent material, in the form of cellulose wadding, projecting upwards from the plastic casing to a sufficient extent to ensure intimate contact between the cellulose and the lower surface of the filter discs. 1 ml amounts of the phosphate-albumin buffer were then pipetted into each reservoir to wash unreacted tracer from the filter discs. The fluid passed rapidly through the filter discs into the absorbent material; the washing process was repeated with a further 1 ml aliquot of buffer.

After washing, the reaction cells were separated from the lower sections containing the absorbent material with unreacted tracer. The latter were discarded and the cells were placed in suitable vials prior to counting for five minutes in a well-crystal scintillation radioactivity counter.

Count rates for each reaction cell are shown in the table. Triplicates were meaned for purposes of drawing the standard curve, and the concentration of digoxin in the unknown plasma sample was determined by interpolation in the normal way.

|  | | Counts per five minutes | | | Mean count rate |
|---|---|---|---|---|---|
| Standards: | Zero | 13948, | 12012, | 12440 | 12800 |
|  | 0.5 ng/ml | 10799, | 9838, | 11146 | 10594 |
|  | 1 ng/ml | 8114, | 8488, | 7662 | 8088 |
|  | 2 ng/ml | 5386, | 4952, | 5506 | 5281 |
|  | 3 ng/ml | 4205, | 4332, | 3896 | 4144 |
|  | 4 ng/ml | 3251, | 3013, | 3421 | 3228 |
|  | 6 ng/ml | 2100, | 2033, | 2211 | 2115 |
| Unknown plasma sample | | 5274, | 5285, | 5661 | 5407 |

From the accompanying standard curve (FIG. 2) it can be seen that the mean count rate of 5407 given by the unknown plasma sample is equivalent to a plasma digoxin concentration of 1.93 ng/ml.

What I claim is:

1. A reaction cell of the type suitable for use in a radioimmunassay reaction in which a liquid reactant is employed and a particulate reaction product results, said cell comprising:
a container;
matrix-pad means in said container for holding all of the liquid necessary to enable said reaction and retaining said particulate reaction product while permitting passage therethrough of other reaction components, said matrix pad means comprising a matrix pad of porous absorptive material which is chemically inactive with respect to said reaction; and
support means in said container for supporting said matrix pad means such that liquid may pass through said matrix pad means from one side thereof to the other.

2. A cell according to claim 1, wherein the matrix pad occludes the interior of the container.

3. A cell as claimed in claim 1, wherein the matrix pad contains a predetermined amount of antigen or antibody.

4. A cell as claimed in claim 3, wherein the antigen or antibody is in solution and the solution is retained within the matrix pad by surface tension or capillary attraction.

5. A cell as claimed in claim 3, wherein the antigen or antibody is freeze-dried.

6. A cell as claimed in claim 5, wherein the matrix pad contains a mixture of a defined amount of corresponding antigen and antibody in a freeze-dried form, at least one of the antibody and antigen being radioactively labelled.

7. A cell as claimed in claim 1 wherein the matrix pad consists of two or more pad layers in the container lying one upon another.

8. A cell as claimed in claim 7, wherein there are two pad layers one containing a predetermined amount of freeze-dried antibody, and the other containing a predetermined amount of the corresponding freeze-dried antigen, at least one of the antibody and antigen being radioactively labelled.

9. A cell as claimed in claim 7, wherein there are three pad layers, one containing freeze-dried antibody, a second containing freeze-dried corresponding antigen, and a third containing the said antigen or its corresponding antibody and being radioactively labelled, the said antigen and antibody being present in predetermined amounts.

10. A cell as claimed in claim 6, wherein the antibody is labelled.

11. A cell as claimed in claim 6, wherein the radioactive label is radioactive iodine.

12. A cell as claimed in claim 8, wherein one or more reagent-free matrix pad layers are interposed between the pad layers containing antigen and antibody.

13. A cell as claimed in claim 1, wherein the matrix pad material is coated, prior to any addition of antigen or antibody, with an inert macromolecular material to inhibit binding of antigen or antibody reactants to the fibres.

14. A cell as claimed in claim 13, wherein the coating material is albumin.

15. A cell as claimed in claim 1, wherein a defined amount of a reagent antibody or antigen and an inert macromolecular material are adsorbed on the matrix fibres.

16. A cell as claimed in claim 15, wherein the antibody is adsorbed on the matrix fibres.

17. A cell as claimed in claim 1, whereof the lower part communicates with a separable lower chamber suitable for receiving a filtrate passing through the matrix pad.

18. A cell as claimed in claim 17, wherein the lower chamber contains a porous absorbent material for absorbing the filtrate, the upper portion of which material abuts or nearly abuts the matrix pad.

19. A cell as claimed in claim 1, whereof the upper part communicates with a separable upper reservoir chamber suitable for receiving liquid to pass into and through the matrix pad.

20. A cell as claimed in claim 19, wherein the upper chamber bears retaining means for the matrix pad in the container.

21. A cell as claimed in claim 20, wherein the retaining means comprises three or more prongs projecting downwardly from the inside of the wall of the upper chamber into the matrix pad container.

22. A kit of apparatus for the performance of radioimmunoassay determinations, comprising at least two reaction cells according to claim 2 in each of which the matrix pad contains a predetermined amount of antibody, for each cell a separate upper liquid reservoir chamber that can be fitted in communication with the upper end of the cell, for each cell a separate lower filtrate chamber that can be fitted in communication with the lower end of the cell and contains absorbent material to abut or substantially abut the matrix pad in the cell to promote filtration, a separate container of the corresponding antigen radioactively labelled, a separate container of a liquid buffer, and at least one separate container of a predetermined amount of the unlabelled corresponding antigen.

23. A kit according to claim 22, wherein the antigen is digoxin human chorionic somatomammotrophin or insulin or growth hormone each matrix pad containing the antibody to one of these.

24. A method for the performance of a chemical and/or biological reaction, for example saturation analysis employing a radioactive marker, said method comprising the steps of:

performing said reaction wholly inside an absorbent matrix pad which is chemically inactive with respect to said reaction;

removing reactant matter from said matrix pad; and retaining a particulate reaction product from said reaction in said matrix pad.

25. A method as claimed in claim 24 in which the reaction takes place exclusively in the absorbent porous matrix.

* * * * *